United States Patent
Fuhr et al.

(10) Patent No.: US 8,609,278 B2
(45) Date of Patent: Dec. 17, 2013

(54) BATTERY CELL

(75) Inventors: Jason D. Fuhr, Sussex, WI (US);
Thomas J. Dougherty, Waukesha, WI (US); John P. Dinkelman, South Milwaukee, WI (US)

(73) Assignee: Johnson Controls—SAFT Advanced Power Solutions LLC, Wilmington, DE (US)

( * ) Notice: Subject to any disclaimer, the term of this patent is extended or adjusted under 35 U.S.C. 154(b) by 0 days.

(21) Appl. No.: 13/042,385

(22) Filed: Mar. 7, 2011

(65) Prior Publication Data

US 2011/0200858 A1    Aug. 18, 2011

Related U.S. Application Data

(63) Continuation of application No. PCT/US2009/056249, filed on Sep. 8, 2009.

(60) Provisional application No. 61/095,522, filed on Sep. 9, 2008.

(51) Int. Cl.
*H01M 4/02* (2006.01)

(52) U.S. Cl.
USPC ............................ 429/209; 429/122; 429/121

(58) Field of Classification Search
USPC .......................................... 429/209, 121, 122
See application file for complete search history.

(56) References Cited

U.S. PATENT DOCUMENTS

| | | | |
|---|---|---|---|
| 5,441,829 A | 8/1995 | Attwood et al. | |
| 6,849,358 B2 * | 2/2005 | O'Connell | 429/211 |
| 7,407,724 B2 | 8/2008 | Coffey et al. | |
| 2005/0048363 A1 | 3/2005 | Gordon et al. | |
| 2006/0078787 A1 * | 4/2006 | Sato et al. | 429/62 |

FOREIGN PATENT DOCUMENTS

| | | |
|---|---|---|
| CN | 1143840 | 2/1997 |
| CN | 1477727 | 2/2004 |
| CN | 1868079 | 11/2006 |
| CN | 101010819 | 8/2007 |
| GB | 2412484 B | 3/2006 |
| JP | 10-12243 A | 1/1998 |
| KR | 10-2007-0046126 | 5/2007 |

OTHER PUBLICATIONS

International Search Report and Written Opinion for International Application No. PCT/US2009/056249, dated Apr. 30, 2010, 7 pages.

* cited by examiner

*Primary Examiner* — Jane Rhee
(74) *Attorney, Agent, or Firm* — Foley & Lardner LLP (57) ABSTRACT

An electrochemical cell includes a cell element comprising at least one electrode. A portion of the at least one electrode extends outward from an end of the cell element. The portion of the at least one electrode is folded onto itself to provide a coupling surface for conductive connection to a terminal of the electrochemical cell.

27 Claims, 7 Drawing Sheets

BATTERY CELL

CROSS-REFERENCE TO RELATED PATENT APPLICATIONS

This application is a continuation of International Patent Application No. PCT/US2009/056249, filed Sep. 8, 2009, which claims the benefit of and priority to U.S. Provisional Application No. 61/095,522, filed Sep. 9, 2008. The disclosures of International Patent Application No. PCT/US2009/056249 and U.S. Provisional Application No. 61/095,522 are incorporated herein by reference in their entireties.

BACKGROUND

The present application relates generally to the field of batteries and battery systems. More specifically, the present application relates to batteries and battery systems that may be used in vehicle applications to provide at least a portion of the motive power for the vehicle.

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles") may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, as is the case with certain types of PHEVs).

As electric vehicle technology continues to evolve, there is a need to provide improved power sources (e.g., battery systems or modules) for such vehicles. For example, it is desirable to increase the distance that such vehicles may travel without the need to recharge the batteries. It is also desirable to improve the performance of such batteries and to reduce the cost associated with the battery systems.

One area of improvement that continues to develop is in the area of battery chemistry. Early electric vehicle systems employed nickel-metal-hydride (NiMH) batteries as a propulsion source. Over time, different additives and modifications have improved the performance, reliability, and utility of NiMH batteries.

More recently, manufacturers have begun to develop lithium-ion batteries that may be used in electric vehicles. There are several advantages associated with using lithium-ion batteries for vehicle applications. For example, lithium-ion batteries have a higher charge density and specific power than NiMH batteries. Stated another way, lithium-ion batteries may be smaller than NiMH batteries while storing the same amount of charge, which may allow for weight and space savings in the electric vehicle (or, alternatively, this feature may allow manufacturers to provide a greater amount of power for the vehicle without increasing the weight of the vehicle or the space taken up by the battery system).

It is generally known that lithium-ion batteries perform differently than NiMH batteries and may present design and engineering challenges that differ from those presented with NiMH battery technology. For example, lithium-ion batteries may be more susceptible to variations in battery temperature than comparable NiMH batteries, and thus systems may be used to regulate the temperatures of the lithium-ion batteries during vehicle operation. The manufacture of lithium-ion batteries also presents challenges unique to this battery chemistry, and new methods and systems are being developed to address such challenges.

It would be desirable to provide an improved battery module and/or system for use in electric vehicles that addresses one or more challenges associated with NiMH and/or lithium-ion battery systems used in such vehicles. It would also be desirable to provide a battery module and/or system that includes any one or more of the advantageous features that will be apparent from a review of the present disclosure.

SUMMARY

According to an exemplary embodiment, an electrochemical cell includes a cell element comprising at least one electrode. A portion of the at least one electrode extends outward from an end of the cell element. The portion of the at least one electrode is folded onto itself to provide a coupling surface for conductive connection to a terminal of the electrochemical cell.

According to another exemplary embodiment, an electrochemical cell includes a cell element comprising at least one electrode having an edge extending outward beyond an end of the cell element. The edge of the at least one electrode is folded onto itself at least once to provide a substantially flat coupling surface for coupling to a terminal of the electrochemical cell.

DETAILED DESCRIPTION

Figure 1A:
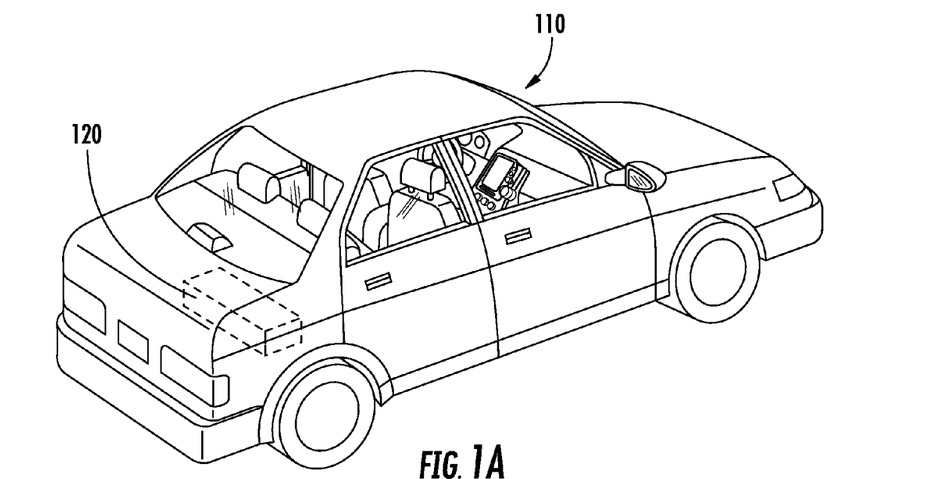
FIG. 1A is a perspective view of a vehicle including a battery module according to an exemplary embodiment.

FIG. 1A is a perspective view of a vehicle 110 in the form of an automobile (e.g., a car) having a battery module 120 for providing all or a portion of the motive power for the vehicle 110. Such a vehicle 110 can be an electric vehicle (EV), a hybrid electric vehicle (HEV), a plug-in hybrid electric vehicle (PHEV), or other type of vehicle using electric power for propulsion (collectively referred to as "electric vehicles").

Although the vehicle 110 is illustrated as a car in FIG. 1A, the type of vehicle may differ according to other exemplary embodiments, all of which are intended to fall within the scope of the present disclosure. For example, the vehicle 110 may be a truck, bus, industrial vehicle, motorcycle, recreational vehicle, boat, or any other type of vehicle that may benefit from the use of electric power for all or a portion of its propulsion power.

Although the battery module 120 is illustrated in FIG. 1A as being positioned in the trunk or rear of the vehicle, according to other exemplary embodiments, the location of the battery module 120 may differ. For example, the position of the battery module 120 may be selected based on the available space within a vehicle, the desired weight balance of the vehicle, the location of other components used with the battery module 120 (e.g., battery management systems, vents or cooling devices, etc.), and a variety of other considerations.

Figure 1B:
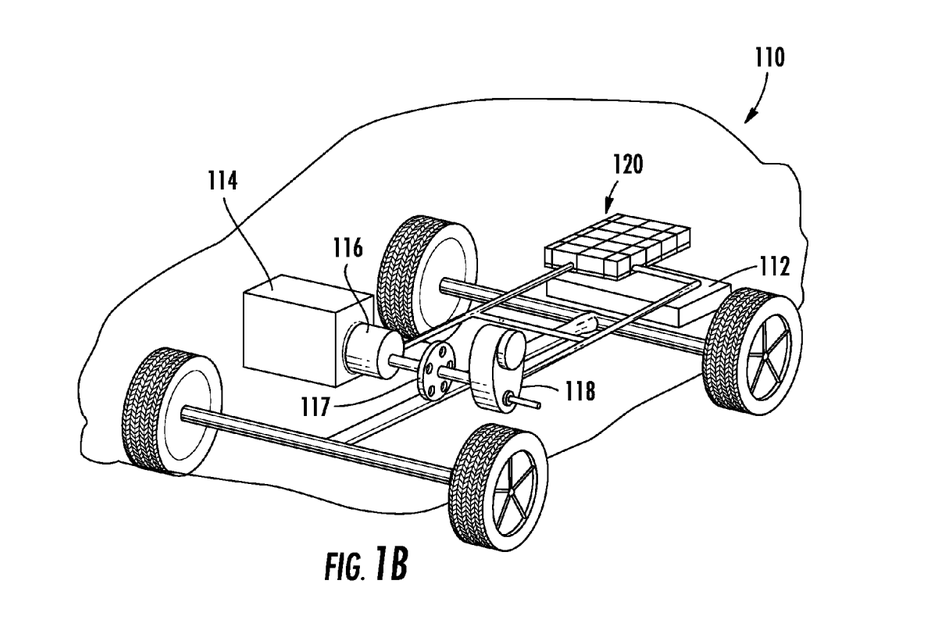
FIG. 1B is a cutaway schematic view of a vehicle including a battery module according to an exemplary embodiment.

FIG. 1B illustrates a cutaway schematic view of a vehicle 110 provided in the form of an HEV according to an exemplary embodiment. A battery module 120 is provided toward the rear of the vehicle 110 proximate a fuel tank 112 (the battery module 120 may be provided immediately adjacent the fuel tank 112 or may be provided in a separate compartment in the rear of the vehicle 110 (e.g., a trunk) or may be provided elsewhere in the vehicle 110). An internal combustion engine 114 is provided for times when the vehicle 110 utilizes gasoline power to propel the vehicle 110. An electric motor 116, a power split device 117, and a generator 118 are also provided as part of the vehicle drive system.

Such a vehicle 110 may be powered or driven by just the battery module 120, by just the engine 114, or by both the battery module 120 and the engine 114. It should be noted that other types of vehicles and configurations for the vehicle drive system may be used according to other exemplary embodiments, and that the schematic illustration of FIG. 1B should not be considered to limit the scope of the subject matter described in the present application.

According to various exemplary embodiments, the size, shape, and location of the battery module 120, the type of vehicle 110, the type of vehicle technology (e.g., EV, HEV, PHEV, etc.), and the battery chemistry, among other features, may differ from those shown or described.

Figure 2:
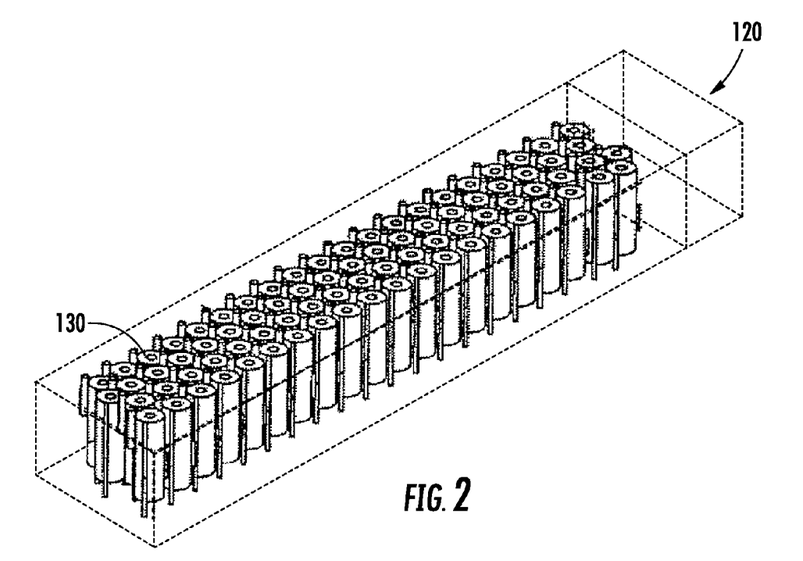
FIG. 2 is a perspective view of a battery module according to an exemplary embodiment.

Referring to FIG. 2, the battery module 120 is shown according to an exemplary embodiment. According to an exemplary embodiment, the battery module 120 includes electrochemical batteries or cells 130, and includes features or components for connecting the electrochemical cells 130 to each other and/or to other components of the vehicle electrical system, and also for regulating the electrochemical cells 130 and other features of the battery module 120. For example, the battery module 120 may include features that are responsible for monitoring and controlling the electrical performance of the battery module 120, managing the thermal behavior of the battery module 120, containment and/or routing of effluent (e.g., gases that may be vented from a cell 130), and other aspects of the battery module 120.

According to an exemplary embodiment, the battery module 120 includes a plurality of electrochemical cells 130 (e.g., lithium-ion cells, nickel-metal-hydride cells, lithium polymer cells, etc., or other types of electrochemical cells now known or hereafter developed). According to an exemplary embodiment, the electrochemical cells 130 are generally cylindrical lithium-ion cells configured to store an electrical charge. According to other exemplary embodiments, the electrochemical cells 130 could have other physical configurations (e.g., oval, prismatic, polygonal, etc.). The capacity, size, design, and other features of the electrochemical cells 130 may also differ from those shown according to other exemplary embodiments.

Each of the electrochemical cells 130 are electrically coupled to one or more other electrochemical cells 130 or other components of the battery module 120 using connectors provided in the form of bus bars or similar elements (not shown). According to an exemplary embodiment, the bus bars are housed or contained in bus bar holders. According to an exemplary embodiment, the bus bars are constructed from a conductive material such as copper (or copper alloy), aluminum (or aluminum alloy), or other suitable material. According to an exemplary embodiment, the bus bars may be coupled to terminals of the electrochemical cells 130 by welding (e.g., resistance welding) or through the use of fasteners (e.g., a bolt or screw may be received in a hole at an end of the bus bar and screwed into a threaded hole in the terminal).

Although illustrated in FIG. 2 as having a particular number of electrochemical cells 130 (i.e., four rows of electrochemical cells arranged such that 20 electrochemical cells are arranged in each row, for a total of 80 electrochemical cells), it should be noted that according to other exemplary embodiments, a different number and/or arrangement of electrochemical cells 130 may be used in the battery module 120 depending on any of a variety of considerations (e.g., the desired power for the battery module 120, the available space within which the battery module 120 must fit, etc.).

According to an exemplary embodiment, the plurality of electrochemical cells 130 are provided in a first member, structure, housing, or tray (not shown). According to an exemplary embodiment, the tray receives the individual electrochemical cells 130 in the proper orientation for assembling the battery module 120. According to an exemplary embodiment, the tray may also include features to provide spacing of the electrochemical cells 130 away from the bottom of the tray and/or from adjacent cells. For example, according to an exemplary embodiment, the trays may include a series of features (e.g., openings, apertures, sockets, etc.) to locate and hold the electrochemical cells 130 in position above a bottom of the tray. According to an exemplary embodiment, the tray may be made of a polymeric material or other suitable material (e.g., electrically insulated material).

Figure 3A:
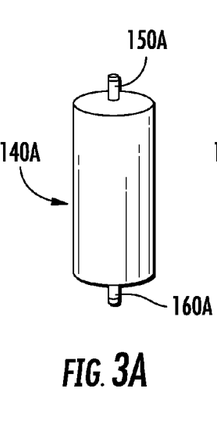
FIG. 3A is a perspective view of an electrochemical cell according to a first exemplary embodiment.
Figure 3B:
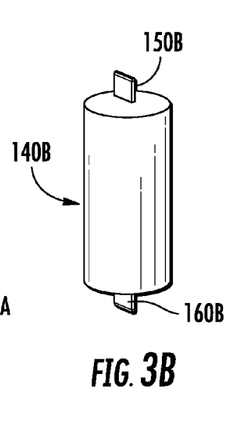
FIG. 3B is a perspective view of an electrochemical cell according to a second exemplary embodiment.
Figure 3C:
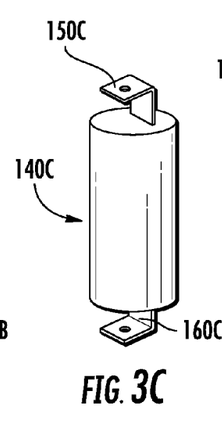
FIG. 3C is a perspective view of an electrochemical cell according to a third exemplary embodiment.
Figure 3D:
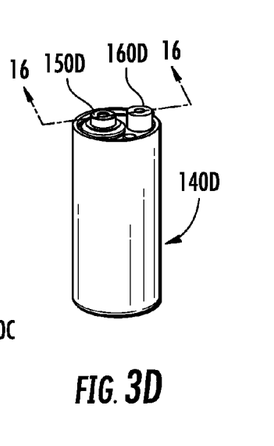
FIG. 3D is a perspective view of an electrochemical cell according to a fourth exemplary embodiment.
Figure 3E:
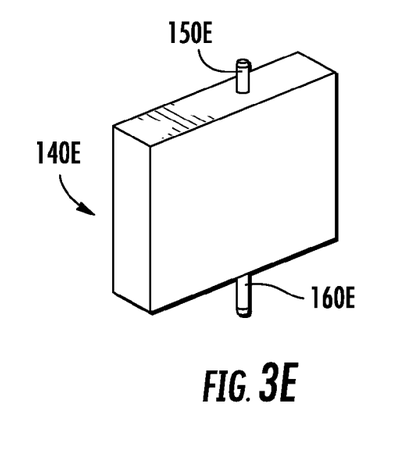
FIG. 3E is a perspective view of an electrochemical cell according to a fifth exemplary embodiment.
Figure 3F:
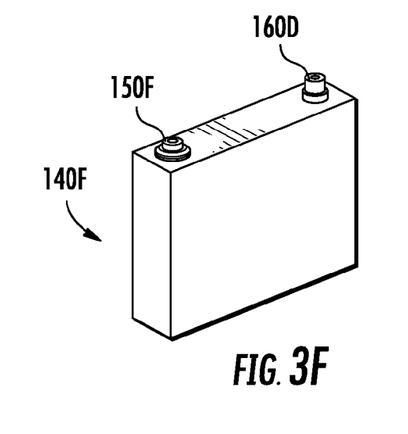
FIG. 3F is a perspective view of an electrochemical cell according to a sixth exemplary embodiment.

FIGS. 3A-3F show various exemplary embodiments of electrochemical cells 140. According to an exemplary embodiment, the electrochemical cells may be cylindrical cells (e.g., as shown in FIGS. 3A-3D), prismatic cells (e.g., as shown in FIGS. 3E-3F), or other types, sizes, or configurations of electrochemical cells.

According to an exemplary embodiment, each electrochemical cell 140 includes a first terminal 150 and a second terminal 160. According to an exemplary embodiment, the first terminal 150 extends from a first end of the cell 140 and the second terminal 160 extends from a second end of the cell 140 (e.g., as shown in FIGS. 3A-3C and 3E). According to another exemplary embodiment, both the first terminal 150 and the second terminal 160 may extend from a single end of the cell 140 (e.g., as shown in FIGS. 3D and 3F). According to other exemplary embodiments, electrochemical cell 140 may have other terminal configurations.

Figure 16:
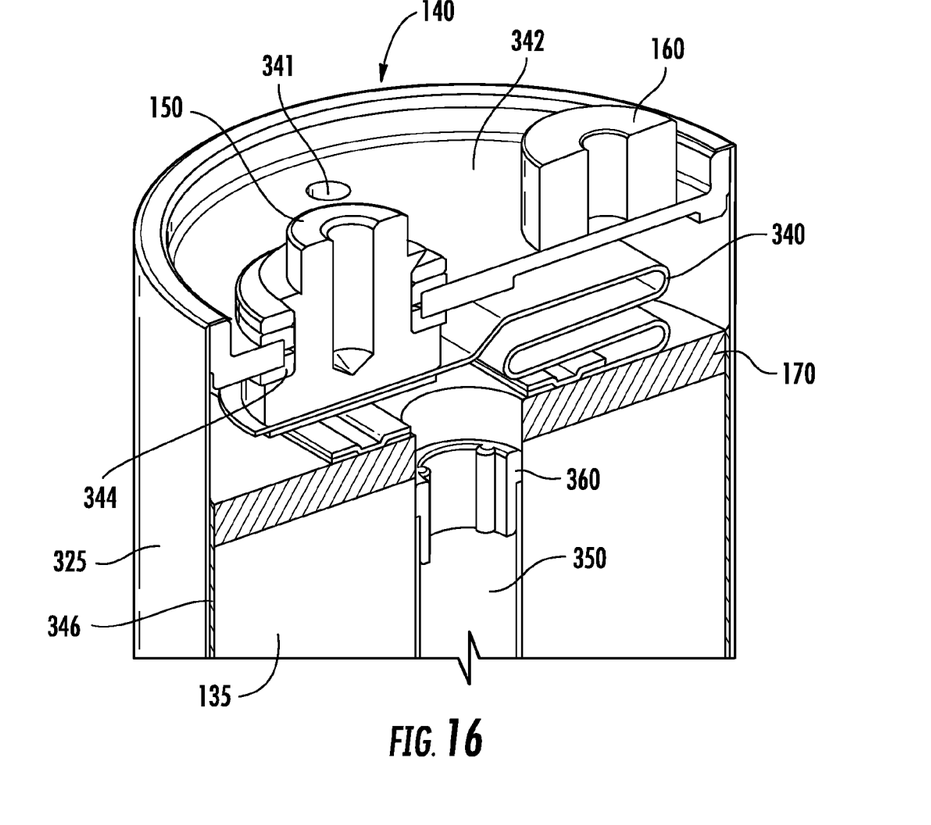
FIG. 16 is a partial cross-section view of the electrochemical cell shown in FIG. 3D taken along line 16-16 in FIG. 3D.

Referring now to FIG. 16, the electrochemical cell 140 includes a container or housing 325, a cap or cover 342, and a cell element 135. According to an exemplary embodiment, the cell element 135 is a wound cell element that includes at least one cathode or positive electrode, at least one anode or negative electrode, and one or more separators. According to another exemplary embodiment, the cell element may be a stacked or prismatic cell element (e.g., to be used with prismatic cells shown in FIGS. 3E-3F). The separators are provided intermediate or between the positive and negative electrodes to electrically isolate the electrodes from each other. According to an exemplary embodiment, the cell 140 includes an electrolyte (not shown). According to an exemplary embodiment, the electrolyte is provided in the housing 325 of the cell 140 through a fill hole 341.

According to an exemplary embodiment, the cell element 135 has a wound configuration in which the electrodes and separators are wound around a member or element provided in the form of a tube or mandrel 350 (e.g., such as shown and described in International Patent Application No. PCT/US2009/053577, which is incorporated herein in its entirety). According to an exemplary embodiment, the mandrel 350 may include a member 360 to at least partially insulate the mandrel 350 from the cell element 135. Although the mandrel 350 is shown as being provided as having a generally cylindrical shape, according to other exemplary embodiments, the mandrel 350 may have a different configuration (e.g., it may have an oval or rectangular cross-section shape, etc.). It is noted that the cell element 135, although shown as having a generally cylindrical shape, may also have a different configuration (e.g., it may have an oval, rectangular, or other desired cross-section shape).

According to another exemplary embodiment, the cell element 135 may have a stacked or prismatic configuration (not shown). In this embodiment, the positive and negative electrodes are stacked upon one another in an alternating fashion, with separators provided intermediate or between the positive and negative electrodes to electrically isolate the electrodes from each other.

According to either the wound or prismatic cell element configurations, according to an exemplary embodiment, the positive electrode is offset from the negative electrode in the axial direction. Accordingly, at a first end of the cell element 135, the positive electrode will extend further than the negative electrode, and at a second (opposite) end of the cell element 135, the negative electrode will extend further than the positive electrode. One advantageous feature of such a configuration is that terminals or current collectors may be connected to a specific electrode at one end of the cell without contacting the opposite polarity electrode. For example, according to an exemplary embodiment, a negative current collector 340 (e.g., as shown in FIG. 16) may be connected to the exposed negative electrode 170 at one end of the cell element 135 and a positive current collector (not shown) may be connected to the exposed positive electrode (not shown) at the opposite end of the cell element 135.

According to an exemplary embodiment, the negative current collector 340 electrically connects the negative electrode 170 to the negative terminal 150 of the cell 140. The negative terminal 150 is insulated from the cover 32 of the housing 325 by an insulator 344, as shown in FIG. 16. According to an exemplary embodiment, the positive current collector (not shown) electrically connects the positive electrode to a bottom of the housing 325. The housing 325 is electrically connected to the cover 342 (e.g., as shown in FIG. 16), which in turn is electrically connected to the positive terminal 160. According to an exemplary embodiment, the cell element 135 may be at least partially insulated from the cell housing 325 by an insulator 346.

Figure 4:
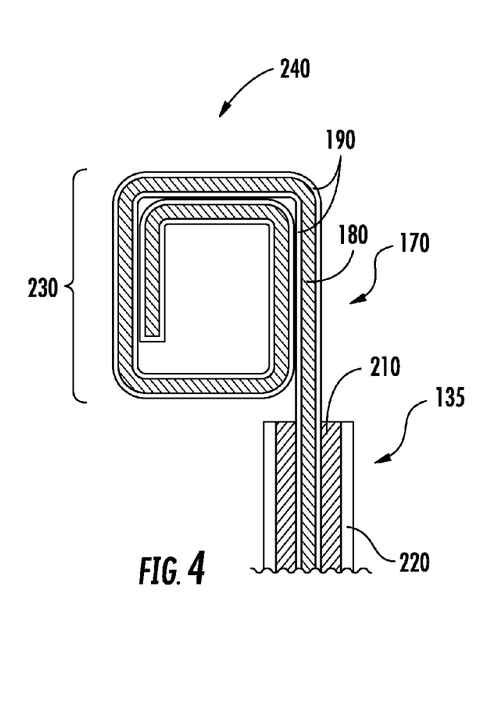
FIG. 4 is a partial cross-section view of a folded composite electrode according to an exemplary embodiment.

Referring to FIG. 4, according to an exemplary embodiment, the cell element 135 includes a first electrode 170 and a second electrode 220 having a separator 210 provided therebetween to prevent contact between the electrodes. According to an exemplary embodiment, the first electrode 170 includes a substrate 180 and a conductive layer 190 provided on opposing faces of the substrate to create a composite member or electrode. According to an exemplary embodiment, the substrate 180 may be constructed of various polymers including Mylar®. According to an exemplary embodiment, the conductive layer 190 may be any suitable metal including copper (or copper alloy) and/or aluminum (or aluminum alloy). In various embodiments, the conductive layer may be provided by coating, lamination, or other suitable process. The separator 210 may be constructed of any known non-conductive material, including polyethylene, polypropylene, etc.

According to an exemplary embodiment, the substrate 180 has a thickness in the range of approximately 10-40 microns. According to another exemplary embodiment, the substrate 180 has a thickness in the range of approximately 15-25 microns. According to another exemplary embodiment, the substrate 180 has a thickness of approximately 20 microns. In various exemplary embodiments, the conductive layer 190 is a thin film or foil having a thickness in the range of approximately 2-20 microns. According to another exemplary embodiment, the conductive layer 190 has a thickness in the range of approximately 5-15 microns. However, it should be appreciated that the thicknesses of the substrate and conductive layers may differ according to other exemplary embodiments. According to an exemplary embodiment, the thicknesses of the substrate and conductive layers should allow the electrode 170 to be flexible for ease of coating and handling, and to avoid kinking and deformation thereof during manufacture of the electrochemical cell 130.

As shown in FIGS. 4-15, a portion or edge 230 (e.g., end, tip, etc.) of electrode 170 may extend beyond the separator 210 and the second electrode 220. According to an exemplary embodiment, the edge 230 may be folded over any number of times (e.g., during the manufacture of the electrode 170, such as prior to the winding or stacking process). FIGS. 4-15 show just a few examples of folding configurations of edge 230. It should be noted that one of ordinary skill in the art would appreciate that there are many other possible folding configurations.

Figure 4A:
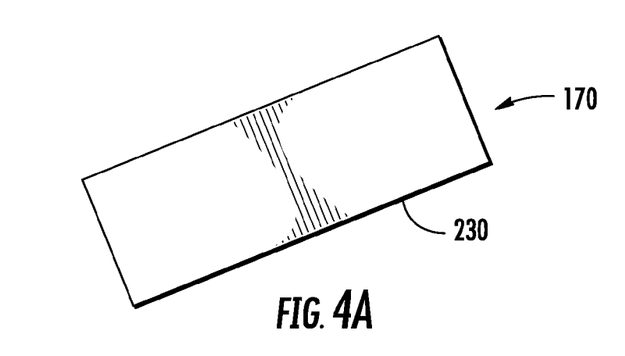
FIG. 4A is a perspective view of an electrode prior to folding according to an exemplary embodiment.
Figures 4B, 4C:
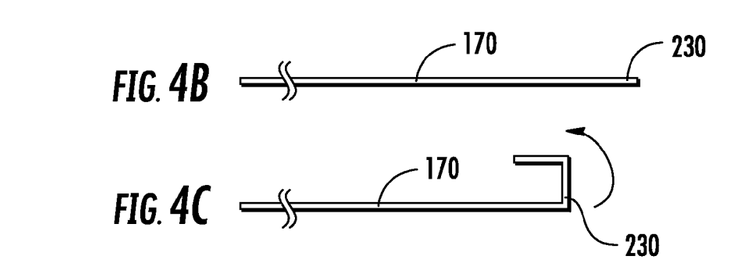
FIGS. 4B-4E are end views of the electrode of FIG. 4A showing a method of folding the electrode according to an exemplary embodiment.
Figure 4D:
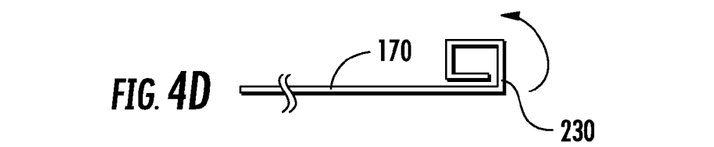
Figure 4E:
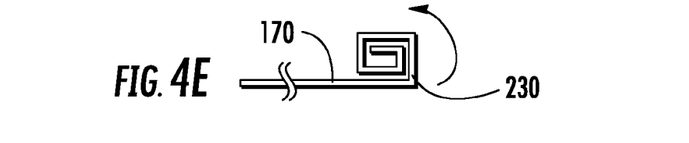
Figure 5:
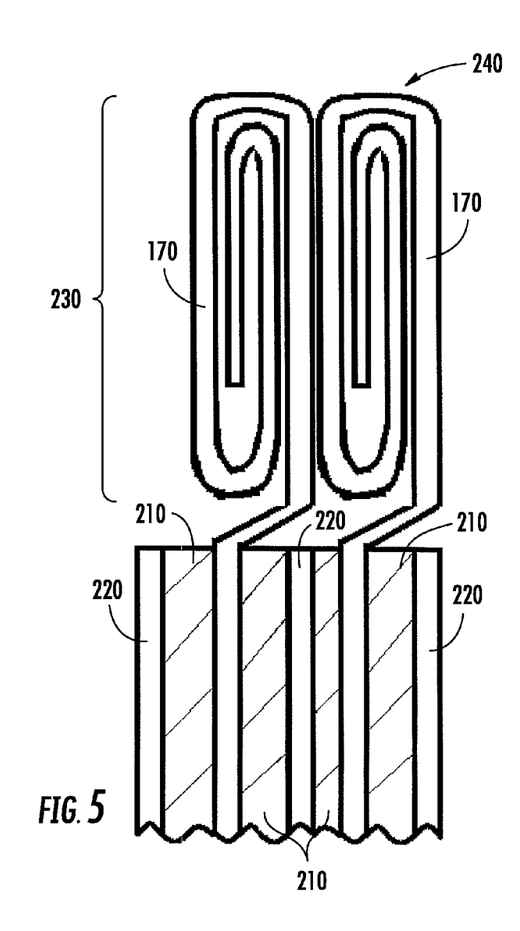
FIGS. 5-15 are partial cross-section views of multiple folded edges of an electrode according to various exemplary embodiments.
Figure 6:
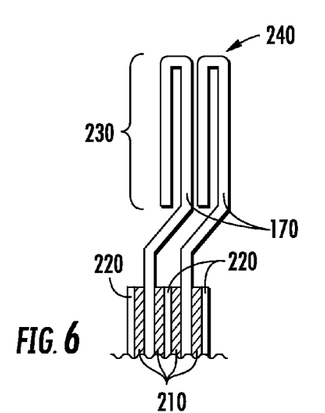
Figure 7:
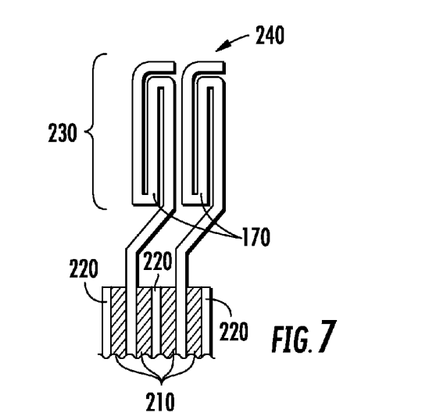
Figure 8:
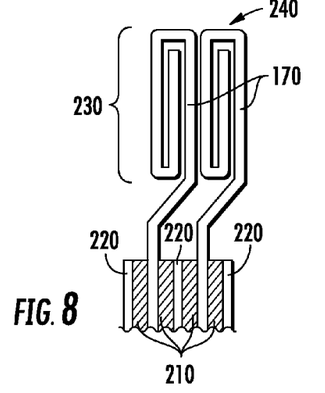
Figure 9:
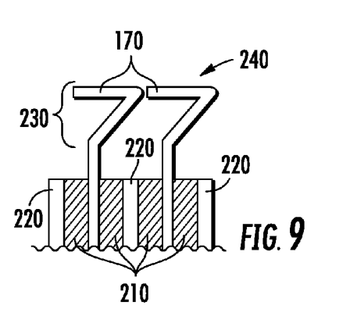
Figure 10:
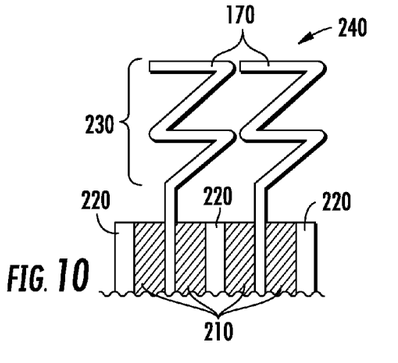
Figure 11:
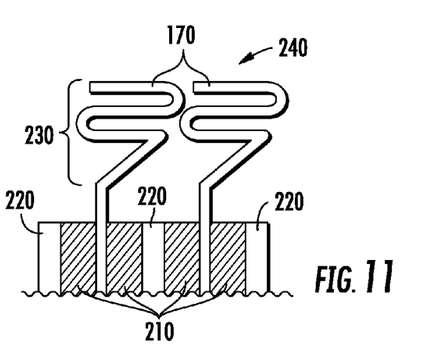
Figure 12:
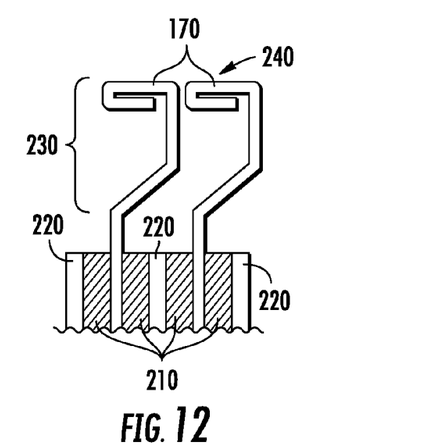
Figure 13:
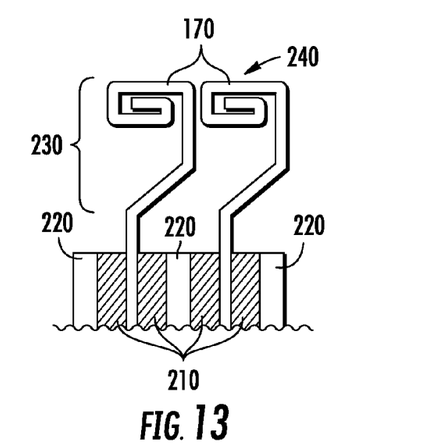
Figure 14:
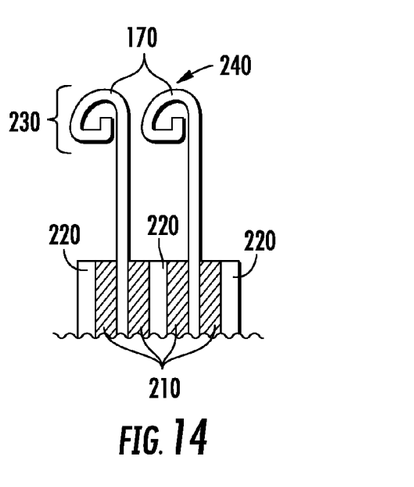
Figure 15:
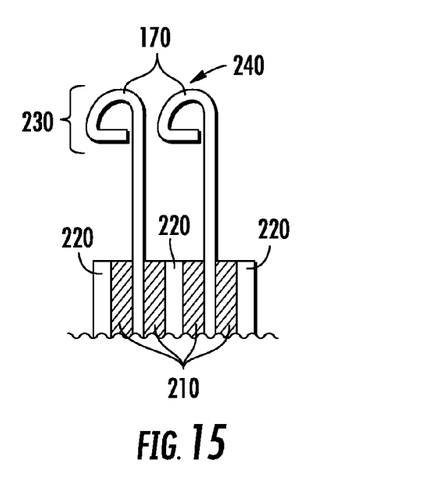

Referring to FIGS. 4A-4E, a method of folding the edge 230 of the electrode 170 is shown according to an exemplary embodiment. As shown in FIGS. 4A-4B, according to an exemplary embodiment, the electrode 170 is shown as a substantially flat member or sheet (e.g., prior to being wound into a wound configuration or stacked into a prismatic configuration). As shown in FIGS. 4C-4E, according to an exemplary embodiment, the edge 230 of the electrode 170 is directed (e.g., manipulated, processed, etc.) through a device (not shown) configured to fold (e.g., flip, curl, roll, etc.) the edge 230 of the electrode 170 onto itself.

According to an exemplary embodiment, the device may be located after a slitting operation of the electrode 170, or after a calendering operation of the electrode, or after a combination slitting/calendering operation of the electrode. According to an exemplary embodiment, the device gradually manipulates the edge 230 (e.g., over a distance of approximately 5-25 ft.) during continuous processing of the electrode 170.

According to an exemplary embodiment, the edge 230 may be folded against or onto itself to provide a coupling surface 240 (e.g., as shown in FIG. 4). The coupling surface 240 provides a substantially flat surface that may then be coupled (e.g., welded) to a terminal or a current collector (e.g., as shown in FIG. 16). According to various exemplary embodiments, the coupling surface 240 may be welded to a terminal or current collector by, for example, a sonic weld, laser weld, explosion weld, electron beam weld, or any other known or later developed method to attach an electrode to a terminal.

According to an exemplary embodiment, a first edge 230 of electrode 170 may be folded such that it is provided adjacent a second (folded) edge 230 of electrode 170 (e.g., as shown in FIGS. 5-15) once the electrode 170 is wound or stacked. Together, the first and second edges 230 may form the coupling surface 240. According to an exemplary embodiment, the first and second edges 230 may be conductively coupled together (e.g., by welding, crimping, piercing, etc.).

According to an exemplary embodiment, the substantially flat, folded portions of the coupling surface 240 of the edge 230 provide additional surface area with which to couple the edge 230 to a terminal (e.g., via a current collector). Having a folded edge 230 is better suited for coupling (e.g., welding) than a non-folded edge (e.g., such as just the end or tip of the edge itself). According to an exemplary embodiment, the edge 230 may be folded to provide a dense, robust portion of electrode for coupling to a terminal or current collector.

According to an exemplary embodiment, the edge 230 has a generally vertical folding configuration (i.e., the vertical portions of the folded edge 230 are longer than the horizontal portions of the folded edge 230, as shown in FIGS. 5-8). The vertical folding configuration creates a dense coupling surface 240 to allow the edge 230 to be efficiently coupled (e.g., welded) to a terminal without the potential for burning through the electrode 170.

According to another exemplary embodiment, for example, FIGS. 9-15 show the edge 230 has a generally horizontal folding configuration (i.e., the horizontal portion(s) of the folded edge 230 is the same length or longer than the vertical portion(s) of the folded edge 230, as shown in FIGS. 9-15). The horizontal folding configuration creates a dense coupling surface 240 to allow the edge 230 to be efficiently coupled (e.g., welded) to a terminal without the potential for burning through the electrode 170.

Referring to FIG. 4, according to an exemplary embodiment, the folding of edge 230 may provide a conductive connection between the opposing conductive layers 190 of the composite electrode 170. For example, by folding the edge 230 of the composite electrode 170 at least twice, the opposing conductive layers 190 may be provided adjacent one another. It should be noted, however, that the edge 230 of the composite electrode 170 may be rolled around itself, rather than being folded, according to another exemplary embodiment.

According to an exemplary embodiment, the opposing conductive layers 190 may physically touch or contact one another, providing a conductive connection between the opposing conductive layers 190. Conductively connecting the opposing conductive layers 190 of the composite electrode 170 together eliminates the need for an additional step (e.g., crimping, piercing, punching, etc.) to conductively couple the opposing conductive layers 190 together. However, according to another exemplary embodiment, the opposing conductive layers 190 may be conductively coupled together by crimping, piercing, punching, welding, etc.

It should be noted that the electrodes 170 shown in FIGS. 5-15 may or may not be composite electrodes (e.g., as shown in FIG. 4), and that the attributes of the composite electrode 170 shown in FIG. 4 may or may not apply to the electrodes 170 shown in FIGS. 5-15. For example, the electrode 170 may comprise only a single conductive material having no substrate.

It should also be appreciated that a conductive material (e.g., copper or copper alloy) may be wound, folded, or otherwise provided into the folded edge 230 (e.g., between one or more of the edges or the conductive layers), either separately or in connection with the process described above, to provide a more robust coupling surface 240 (and/or additional surface area on which to couple or weld the electrode 170 to a terminal or current collector).

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the electrochemical cell as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An electrochemical cell comprising:
a cell element comprising at least one electrode, an integral portion of the at least one electrode extending outward from an end of the cell element, the portion of the at least one electrode folded onto itself to provide a coupling surface for conductive connection to a terminal of the electrochemical cell;
wherein the at least one electrode comprises a substrate having opposing conductive layers coupled to either side of the substrate to form a composite electrode.

2. The electrochemical cell of claim 1, wherein the portion of the at least one electrode is folded onto itself at least twice.

3. The electrochemical cell of claim 1, wherein the at least one electrode has a second portion extending outward from the end of the cell element, the second portion folded onto itself and provided adjacent the first portion.

4. The electrochemical cell of claim 3, wherein the first and second portions are conductively coupled together.

5. The electrochemical cell of claim 4, wherein the first and second portions are approximately 20 microns thick.

6. The electrochemical cell of claim 1, further comprising a second electrode and at least one separator provided between the first electrode and the second electrode.

7. The electrochemical cell of claim 1, wherein the cell element is a wound cell element.

8. The electrochemical cell of claim 1, wherein the composite electrode is folded at least twice to provide a first one of the opposing conductive layers adjacent to a second one of the opposing conductive layers.

9. The electrochemical cell of claim 8, wherein the first one of the opposing conductive layers is conductively coupled to the second one of the opposing conductive layers.

10. The electrochemical cell of claim 8, wherein the first one of the opposing conductive layers is conductively coupled to the second one of the opposing conductive layers by at least one of a piercing, crimping, and welding process.

11. The electrochemical cell of claim 1, wherein the substrate has a thickness of approximately 20 microns.

12. The electrochemical cell of claim 11, wherein the opposing conductive layers have a thickness of between approximately 2 and 20 microns.

13. The electrochemical cell of claim 1, wherein the electrochemical cell is a lithium-ion electrochemical cell.

14. The electrochemical cell of claim 1, wherein the cell element is a prismatic cell element.

15. An electrochemical cell comprising:
a cell element comprising at least one electrode provided as a continuous sheet and a separator, the at least one electrode having a first portion formed from the continuous sheet that is in contact with the separator and a second portion formed from the continuous sheet that is not in contact with the separator;
wherein the second portion of the at least one electrode is folded onto itself at least once to provide a substantially flat coupling surface for coupling to a terminal of the electrochemical cell; and
wherein the at least one electrode comprises a substrate having opposing conductive layers coupled to either side of the substrate to form a composite electrode.

16. The electrochemical cell of claim 15, wherein the second portion of the at least one electrode is folded onto itself at least twice.

17. The electrochemical cell of claim 15, wherein the at least one electrode comprises a first electrode provided as a first continuous sheet having a first portion formed the first continuous sheet that is in contact with the separator and a second portion formed from the first continuous sheet that is not in contact with the separator and comprises a second electrode provided as a second continuous sheet having a first portion formed from the second continuous sheet that is in contact with the separator and a second portion formed from the second continuous sheet that is not in contact with the separator, wherein each second portion of the first and second electrodes is folded onto itself and is provided adjacent the other second portion to cooperatively provide a substantially flat coupling surface for coupling to the terminal of the electrochemical cell.

18. The electrochemical cell of claim 15, wherein the composite electrode is folded at least twice to provide a first one of the opposing conductive layers adjacent to a second one of the opposing conductive layers.

19. The electrochemical cell of claim 15, wherein the at least one electrode includes a third portion formed from the continuous sheet that is not in contact with the separator, the third portion of the at least one electrode being folded onto itself;
wherein the continuous sheet is provided in a layered relationship, a first layer including the second portion and a second layer including the third portion; and
wherein the second portion and the third portion are provided adjacent to each other to cooperatively provide a substantially flat coupling surface for coupling to the terminal of the electrochemical cell.

20. The electrochemical cell of claim 15, wherein the first portion of the at least one electrode is positioned adjacent a surface of the separator, and the second portion of the at least one electrode is positioned outward from an end of the separator.

21. An electrochemical cell comprising:
a cell element comprising an electrode and a separator, the electrode comprising a first portion that is provided adjacent the separator and a second portion that is formed together with the first portion as part of a continuous sheet of material, wherein the second portion extends without interruption from the first portion to a location beyond an end of the separator;
wherein the second portion of the electrode is folded onto itself beyond the end of the separator to provide a coupling surface for conductive connection to a terminal of the electrochemical cell;
wherein the at least one electrode includes a third portion formed from the continuous sheet and extends without interruption from the first portion to a location beyond an end of the separator, the third portion of the at least one electrode being folded onto itself; and
wherein the continuous sheet is provided in a layered relationship, a first layer including the second portion and a second layer including the third portion.

22. The electrochemical cell of claim 21, wherein the cell element is wound about a central axis, and the second portion of the electrode extends parallel to the central axis and is folded onto itself in a direction toward or away from the central axis.

23. The electrochemical cell of claim 21, wherein the second portion of the electrode is folded onto itself more than once consecutively in a single direction relative to the central axis.

24. The electrochemical cell of claim 21, wherein the cell element includes the electrode, the separator, and at least one additional electrode of opposite polarity as the electrode that are wound into an inner winding, and the second portion of the electrode is folded onto itself beyond an end of the inner winding.

25. The electrochemical cell of claim 21, wherein the electrode includes first and second opposed edges, and the second portion includes the first opposed edge and is folded onto itself toward the second opposed edge.

26. The electrochemical cell of claim 25, wherein the second portion of the electrode is folded onto itself more than once consecutively in a single direction relative to the second opposed edge.

27. The electrochemical cell of claim 21, wherein the cell element includes a second electrode comprising a first portion that is provided adjacent the separator and a second portion that is formed together with the first portion as part of a second continuous sheet of material, wherein the second portion extends without interruption from the first portion to a location beyond an end of the separator; and wherein the second portion of the second electrode is folded onto itself to provide a coupling surface for conductive connection to a terminal of the electrochemical cell.

\* \* \* \* \*